US008689784B2

(12) United States Patent
Monsebroten

(10) Patent No.: US 8,689,784 B2
(45) Date of Patent: Apr. 8, 2014

(54) SOLAR CONCENTRATOR SYSTEM

(76) Inventor: James Matthew Monsebroten, Coos Bay, OR (US)

( * ) Notice: Subject to any disclaimer, the term of this patent is extended or adjusted under 35 U.S.C. 154(b) by 0 days.

(21) Appl. No.: 11/522,189

(22) Filed: Sep. 14, 2006

(65) Prior Publication Data

US 2008/0092877 A1  Apr. 24, 2008

(51) Int. Cl.
F24J 2/24 (2006.01)

(52) U.S. Cl.
USPC ........... 126/658; 126/683; 126/684; 126/696; 126/698; 126/700

(58) Field of Classification Search
USPC ................................. 126/683–700
See application file for complete search history.

(56) References Cited

U.S. PATENT DOCUMENTS

| | | | |
|---|---|---|---|
| 593,045 A | 11/1897 | Cummings | |
| 937,013 A | 10/1909 | Severy | |
| 1,101,001 A | 6/1914 | Willsie | |
| 1,673,429 A | 6/1929 | Vinson | |
| 1,951,403 A | 3/1934 | Goddard | |
| 1,989,999 A | 2/1935 | Niederle | |
| 3,052,229 A * | 9/1962 | Wenger | 126/605 |
| 3,125,091 A | 3/1964 | Sleeper, Jr. | |
| 4,246,477 A * | 1/1981 | Latter | 250/214 AL |
| 4,249,083 A * | 2/1981 | Bitterly | 290/1 R |
| 4,277,129 A * | 7/1981 | Taucher | 359/365 |
| 4,307,711 A | 12/1981 | Doundoulakis | |
| 4,312,330 A | 1/1982 | Holdridge | |
| 4,329,021 A | 5/1982 | Bennett et al. | |
| 4,341,204 A | 7/1982 | Bloxsom | |
| 4,365,618 A * | 12/1982 | Jones | 126/576 |
| 4,385,808 A | 5/1983 | Vanderwerf | |
| 4,389,085 A * | 6/1983 | Mori | 359/591 |
| 4,411,490 A * | 10/1983 | Daniel | 126/648 |
| 4,421,104 A | 12/1983 | Adcock | |
| 4,496,787 A * | 1/1985 | Touchais et al. | 136/248 |
| 4,511,755 A * | 4/1985 | Mori | 136/246 |
| 4,545,366 A | 10/1985 | O'Neil | |
| 4,593,976 A | 6/1986 | Eijadi et al. | |
| 4,672,949 A | 6/1987 | O'Neill | |
| 4,719,904 A | 1/1988 | O'Neill | |
| 4,848,319 A | 7/1989 | Appeldorn | |
| 4,887,589 A * | 12/1989 | Frohardt et al. | 126/571 |
| 4,893,612 A | 1/1990 | Dawson | |
| 5,005,360 A * | 4/1991 | McMurtry | 60/659 |
| 5,047,654 A * | 9/1991 | Newman | 290/52 |
| 5,153,621 A * | 10/1992 | Vogeley | 353/30 |
| 5,195,503 A * | 3/1993 | Ludlow | 126/600 |
| 5,255,666 A | 10/1993 | Curchod | |
| 5,374,317 A | 12/1994 | Lamb et al. | |
| 5,408,990 A | 4/1995 | Edling et al. | |

(Continued)

Primary Examiner — Kenneth Rinehart
Assistant Examiner — Jorge Pereiro

(57) ABSTRACT

An improved solar concentrator, where because sunlight is focused into parallel or collimated beams the light can be reflected and controlled by a series of mirrors and collected to form increasingly powerful collimated beams targeted onto a reactor; where each array tracks the sun with a dual-axis solar tracker, an array has multiple units that have a collecting fresnel lens, a collimating lens and a mirror, an array has a centralizing mirror which gathers the fresnel unit light in middle of each array, the array beams are then reflected off of a series of mirrors that bounce the light beams form mirror to mirror and collect the beam energy from multiple arrays into one or more high power beams, which are bounced off mirrors until they hit the reactor.

20 Claims, 14 Drawing Sheets

(56) References Cited

U.S. PATENT DOCUMENTS

| | | | |
|---|---|---|---|
| 5,505,789 A | 4/1996 | Fraas et al. | |
| 5,540,216 A * | 7/1996 | Rasmusson | 126/683 |
| 5,648,873 A * | 7/1997 | Jaster et al. | 359/591 |
| 5,940,152 A * | 8/1999 | Wilson et al. | 349/57 |
| 6,020,554 A | 2/2000 | Kaminar et al. | |
| 6,075,200 A | 6/2000 | O'Neill | |
| 6,111,190 A | 8/2000 | O'Neill | |
| 6,164,786 A * | 12/2000 | Lloyd | 359/851 |
| 6,607,163 B2 * | 8/2003 | Perry et al. | 244/24 |
| 6,691,701 B1 * | 2/2004 | Roth | 126/685 |
| 6,700,055 B2 | 3/2004 | Barone | |
| 6,899,097 B1 * | 5/2005 | Mecham | 126/591 |
| 7,536,861 B2 * | 5/2009 | Walpita | 60/641.11 |
| 7,848,033 B2 * | 12/2010 | David | 359/742 |
| 2005/0011513 A1 * | 1/2005 | Johnson | 126/698 |
| 2007/0062195 A1 * | 3/2007 | Walpita | 60/641.15 |
| 2007/0268597 A1 * | 11/2007 | David | 359/710 |
| 2009/0050324 A1 * | 2/2009 | McNelly et al. | 166/302 |

* cited by examiner

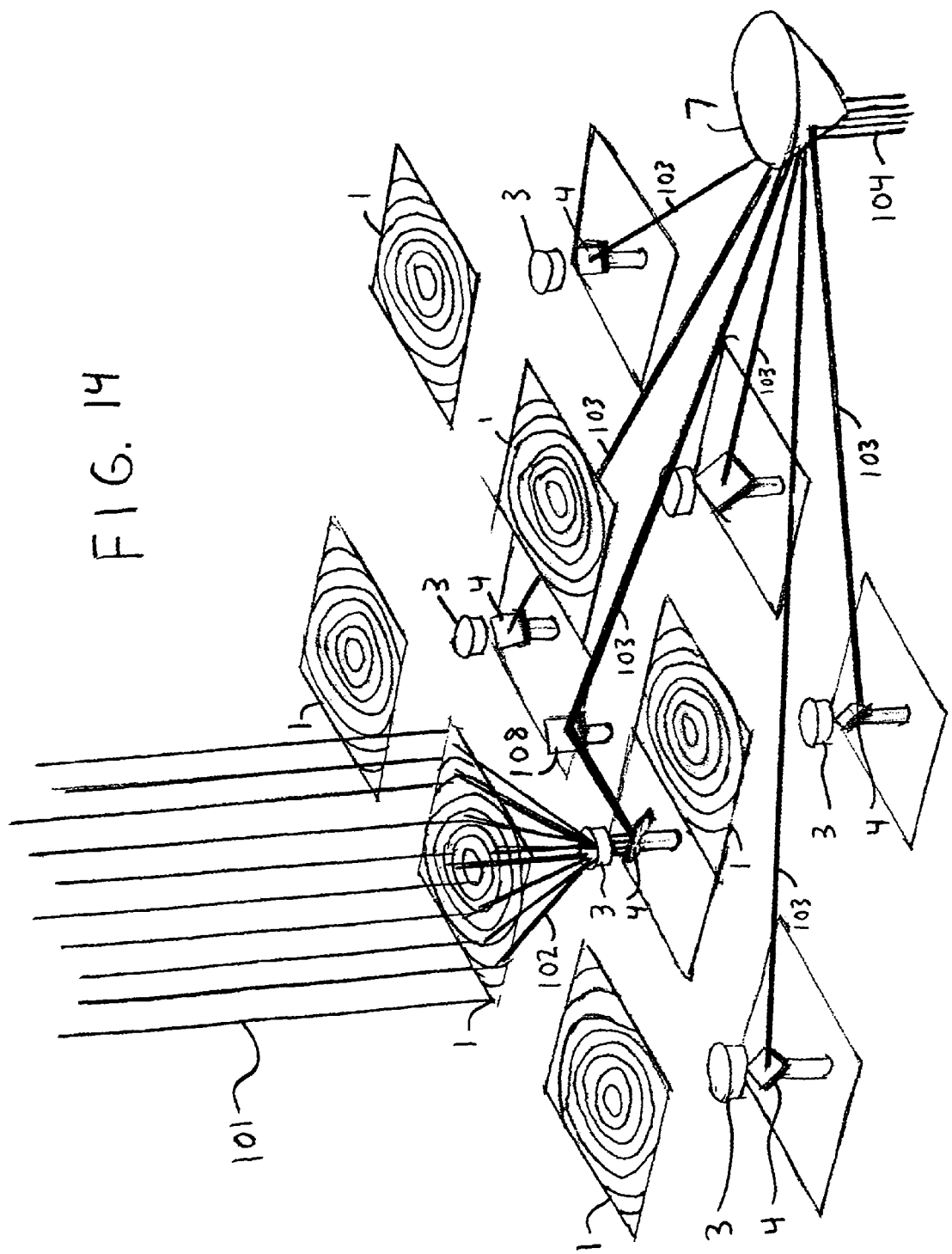

SOLAR CONCENTRATOR SYSTEM

FIELD OF INVENTION

This invention relates to solar energy, specifically an improved means, method and apparatus for collecting and concentrating solar energy.

BACKGROUND OF THE INVENTION

Until this invention, alternative energy sources to coal, oil and natural gas, have not provided a solution to the depletion of fossil fuel resources or the pollution and environmental damage caused by coal, oil and natural gas. The demand energy is increasing as more and more people use energy consuming technology in their daily lives. This increased demand is occurring in the United States of America and globally. Oil, coal and natural gas are limited natural resources and the global supply is being consumed more quickly than ever before.

Nuclear energy is efficient and long-lasting but creates radioactive waste and potential contamination such as 3 mile island or the Chernobyl nuclear reactor melt down. Hydro power plants provide energy with no air pollution, but damage salmon runs, require the flooding of upriver environments and change entire local ecosystems. So, there is certainly an increasing need for an inexpensive, efficient, clean, and non-depleting energy source. Concentrated solar power can provide this energy source. This invention provides a new way of concentrating solar power.

For thousands of years people have not developed a system for concentrating solar energy, as this invention does. From the long history of solar energy utilization, this invention finally provides the right design to meet the increasing demand for energy. The power of the sun has been depicted in ancient Egyptian hieroglyphics as hands attached to the beams of light radiating on the ancient Egyptian Pharos. This invention brings the depictions of those hand rays together into a collimated beam, a beam column to support the energy demands of civilization for the next millennium.

In the past Millenia, solar power has been used, but not to the degree this invention would allow. Sunlight has been focused by troops under the direction of Archimedes. Greco-Roman historians assert that during the Roman siege of Syracuse from 214 to 212 B.C., at the height of the Second Punic War, Archimedes directed troops to form a large parabolic troughs using bronze mirrors to focus sunlight on Roman ships and set them on fire. Plinius (23-79 AD) indicated that ancient Roman physicians used glass spheres filled with water to focus light to burn wounds and heal infections.

During the 9th century AD, Kings and Caliphs of the Arab world, focused light to burn targets objects 30 to 100 cubits away. Around 1000 AD al-Hytham, Abu Ali al-Hasan ibn al-Haytham, 966-1040 believed that the sun's rays of light were streams of tiny particles travelling in straight lines and researched spherical and parabolic mirrors regarding focusing sunlight. In China, the Middle East and Europe in the middle ages telescopes were used aid distant viewing to discover new worlds or better see an attacking enemy.

Around 1819, French physicist Augustin Fresnel (1788-1827), conducted a experiments and developed a lens—the Fresnel Lens. Faced with the need to construct a large lens for a lighthouse of appropriate focal length, and unable to support the large weight of a double convex lens of that size, Fresnel developed a lens comprising thick lens sections, maintaining the same focal length with a fraction of the weight. Hence the development of the Fresnel lens.

In 1913 a Mr. Shuman created an array of parabolic troughs in Egypt about the size of two football fields. The array was designed to heat water in the focal point of the trough. This ran a 41 kW pumping system installed in Egypt by Shuman. This system consisted of five north/south axis parabolic trough concentrators with an aperture width of 4 m and an aperture area of 1255 square meters. Shuman's system worked successfully for a number of years.

In the 1970s, in southern France, a large parabolic solar concentrator was constructed using a tower at the center to collect the thermal energy of the concentrated light and pumping through molten salts to transfer heat to a turbine.

In the 1980 and 1990s the Lutz project in the Mojave dessert in California has been one of the worlds large-scale application of solar concentrators with parabolic troughs built to run with a hybrid solar-gas power plant. The Lutz project consisted of single axis parabolic troughs. With a pipe at the focal point molten salts transferred the heat to a central reactor for energy production.

Currently there are a variety of parabolic troughs/dishes that track the sun or that are stationary and are used to concentrate solar energy. These parabolic concentrators are readily available in the United State's market and are available in most states or can be purchased over the Internet. So the contemporary means of producing solar energy are from solar concentrating troughs or mirror isotherms, photovoltaic cells, or passive solar heating. Overall these systems have not provided sufficient efficiency, economy of production, or power to become a viable alternative to fossil fuels.

BACKGROUND

Description of the Prior Art

The prior art has limited efficiency. The prior art requires the transportation of hot fluid through pipes as part of the collection or concentration of energy resulting in inefficiencies due to heat loss. The prior art is limited by the efficiency of solar cells because the photovoltaic process has limited efficiencies. Additionally, the relatively high cost of manufacturing solar cells creates an economic burden for creating electricity from such solar cells. The following references provide a wide variety of inventions which collect solar energy. None of these patents, however, discloses or suggests a light collection method and apparatus that is a sufficiently consistent and reliable for providing power to a traditional electric power systems.

In U.S. Pat. No. 593,045 (1897) to Cummings is basically a sheet of prisms used to spray light as it passes through the special window or lens, it has very limited utility.

In U.S. Pat. No. 937,013 (1909) to Senery combined a number of elements. It is a patent that focuses direct sunlight onto coiled water pipes but also includes direct sunlight reflected through prisms to the coiled pipes. All of this is mounted on a mechanical solar tracker that would track the sun throughout the day. The coiled pipes can not collect enough energy to drive a turbine or be used on a large-scale basis.

The prior art in solar collectors between 1914 to about 1964 basically involved heating pipes in the sun and pumping the hot water into a utility tank. These formulations can be seen in the following patents: In U.S. Pat. No. 1,101,001 (1914) to Willsie; in U.S. Pat. No. 1,673,429 (1928) Vinson, has, an open box with pipes running through the box; in U.S. Pat. No. 1,951,403 (1934) Goddard; in U.S. Pat. No. 1,989,999 (1935) to Niederle, who has a heated pipe laid out to the sun with an internal hot water pipe to transfer the heat.

In U.S. Pat. No. 3,125,091 (1964) Sleeper, Jr. documented the trend of focusing a lens on a pipe laying in the sun as an advancement in heating pipes using a Fresnel lens.

In U.S. Pat. No. 4,307,711 (1981) to Doundoulakis demonstrated a utility of a Fresnel lens illuminating part of a pipe for heating, from the lens and part of the pipe back-lit to take advantage of all of the light from the lens. Doundoulakis combines two inverted, arched Fresnel lenses to create a point source of light rather than a circle of light, however this invention fails to truely concentrate the light into beams that are of sufficient utility it merely makes the pipes somewhat more efficient.

U.S. Pat. No. 4,312,330 (1982) to Holdridge, uses a solar tracker with fresnel lenses to focuses light onto a heat pipe or photo cell. This invention is still limited by the loss of heat from pipes and limited efficiency and the expense of photo cells.

In U.S. Pat. No. 4,341,204 (1982) issued to Bloxsom, used a lens to concentrate heat onto a fluid-transporting pipe/means. Fluid transportation is subject to inefficiencies of heat loss during the transfer. Additionally, it didn't collect all of the incoming radiation.

In U.S. Pat. No. 4,421,104 (1983) issued to Adcock, a solar trough tracks the sun and heats a tube to transfer the collected solar heat.

In U.S. Pat. No. 4,593,976 (1986) issued to Eijadi, et al. a indirect sunlight is collected for interior lighting. It uses a Fresnel lens to direct light into a building for lighting. In U.S. Pat. No. 4,329,021 (1982) issued to Bennett, Eijadi also used interior lighting to direct light into a building. Neither of these inventions collects light to produce a high power utility beam that could be used to generate electricity.

In U.S. Pat. No. 4,848,319 (1989) issued to Appeldorn uses several Fresnel lenses to focus light on tubes. The tubes then pump out the hot fluid to a heat transmission source. Once again the loss of heat in transmission as well as the inability to take advantage of all of the incoming sunlight are drawbacks to this invention.

In U.S. Pat. No. 4,893,612 (1990) to Dawson combines the bowel shaped thurough system with an additional initial level of a lens above the bowel that allows the sunlight to be directed at a thermal receiving point with out tracking the sun. This loses heat through the necessity to convey heat. This is not able to collect the full solar energy.

In U.S. Pat. No. 5,255,666 (1993) to Curchod uses a Fresnel lens to focus light onto solar cells. This is limited in the amount of light delivered to the photo-voltaic cells. This is limited to the efficiency of the solar cell energy process.

In U.S. Pat. No. 5,374,317 (1994) to Lamb, et al. is an invention that primarily seeks to get more light to a limited number of photovoltaic cells. It uses multiple reflectors/mirrors to reflect light similar to a solar trough system with the but using a single plain of mirrors with alternate angles rather than a silvered trough. It concentrates light on a line of photovoltaic cells.

In U.S. Pat. No. 5,408,990 (1995) to Edling, et al. uses a Fresnel lens to focus light on a tub to heat the tube. This allows only for a single level of concentration—the lens array. This also suffers from the same inefficiencies in lost heat as the physical heat medium in the tubes must lose heat and thereby be less efficient. This is similar to the parabolic thorough which have a pipe at the focal point of the thorough. Here, Ediling, et al. substitutes the Fresnel lens for a reflective polished metal thorough.

In U.S. Pat. No. 5,505,789 (1996) to Fraas, et al. is primarily a utility to make photovoltaic cells more efficient by increasing the light delivered to them using a Fresnel lens.

In U.S. Pat. No. 6,020,554 (2000) to Kaminar, et al. the prior art uses a Fresnel lens to focus light onto solar cells. This method is still very limited in the light concentration. It limits the collection of light to a single lens. Furthermore, it appears to be only a single axis tracking apparatus.

In U.S. Pat. No. 6,700,055 (2000); U.S. Pat. No. 4,545,366 (1985); U.S. Pat. No. 4,672,949 (1987); U.S. Pat. No. 4,719,904 (1988); U.S. Pat. No. 6,111,190 (2000); U.S. Pat. No. 6,075,200 (2000); U.S. Pat. No. 6,700,055 (2000), all to O'Neill prior art uses a Fresnel lens to focus light onto solar cells. U.S. Pat. No. 6,075,200 (2000) is also still very limited in the light concentration. It limits the collection of light to a single lens. Furthermore, it appears to be only a single axis tracking apparatus. This is particularly similar to U.S. Pat. No. 6,020,554 (2000) to Kaminar, et al.

SUMMARY OF THIS INVENTION

Direct sunlight strikes a field of Fresnel lenses. Each lens focuses the light into a point where the light it formed into a collimated beam using a lens. All of these beams from each lens are then gathered together on a lower layer. They are gathered together by using mirrors or lenses to reflect the collimated beams to a central point. This central point then reflects all of the collimated beams into a larger collimated beam. The larger collimated beam is targeted into a network of mirrors or redirecting lenses. These mirrors or lenses of the beam network collect light energy from multiple collectors. All of this energy is then targeted to a steam turbine reactor to create electricity.

DETAILED DESCRIPTION

The Fresnel Lens Array—the Primary Plane

A group of Fresnel lenses are secured in a plane or array. They are positioned to take in direct sunlight, parallel rays of sunlight arriving at the earth: as opposed to diffuse sunlight, rays which have already been deflected. Fresnel lenses could be substituted with conventional lenses, however they are the preferred embodiment because of the cost effectiveness and relatively light weight of the Fresnel lens.

The Focal Plane Array—the Secondary Plane

A plurality of these Fresnel lens/concave lens/mirror units form the concentrator. The light rays passing through the Fresnel lenses are focused. Before the rays can cross the focal plane and diverge outward the intersecting rays are redirected by concave lenses positioned to each Fresnel lens. The concave lenses convert the diverging light rays into a beam of light that is approximately parallel and collimated. Mirrors positioned at about the focal point of each Fresnel lens direct the collimated beam about forty-five degrees. The beams are directed toward a central point in the array.

The Central Point Cone Mirror/Cone Shaped Mirror

At the central point on the secondary plane all of the beams from the array come together. A cone shaped mirror is located at this central point. The cone shaped mirror is pointed so that the wide base of the cone is toward the Fresnel lenses and the tip of the cone is pointed away from the Fresnel lenses. The cone is pointed in about the same direction that the original sunlight is coming from. The collimated light beams are then directed at right angles away from the Fresnel lens plane by the cone shaped mirror. This joins the collimated beams into a more powerful collimated beam. The collimated beam coming from the cone shaped mirror is about parallel to, and in the same direction as the original captured direct sunlight. The output at this stage of the invention is a powerful concentration of sunlight. Taking sunlight from an area of direct sunlight approximately one square meter, initially captured by the array of Fresnel lenses to a concentrated high power beam approximately the size of a human finger.

Solar Tracking Means

This solar collector is mounted on a metal tube approximately 6 inches in diameter. The pipe would be approximately four to six feet high. Galvanized steel would be a preferred material. The pipe would be cemented to the ground. A hole on the side of the pipe about two feet to three feet off the ground would allow for a beam network pipe to T-off parallel to the ground and perpendicular to the pipe. A mirror would be located at the intersection of the center of the support pipe and the center of the beam network pipe. This minor would be the means to reflect the light beam from the support pipe to the beam network pipe. The light beams are directed down the middle of the pipe. The pipe's utility is to prevent obstruction of the beam by debris, foreign objects, and to protect people working in the vicinity of the beam from getting injured from the high power beam.

The mounting attachment consists of a dual axis solar tracker means. This device rotates the array to keep the lens perpendicular to the sun and the focal point on the minors below the lenses.

Also located in the immediate area of the dual axis drivers for solar tracking is a dual axis mirror. This mirror takes the light beam from the concentrator: it is then reflected from this dual axis movable mirror. The alignment of the mirror changes constantly to coordinate the mirror's dual axis position relative to the ground based location. (It would be possible to dispense with this mirror if the collector was located in space and not in an orbit.) The mirror functions to target the beam down the mounting tube. The targeting mirror then shoots the beam down the support tube toward the ground and away from the concentrator.

The Beam Network/Optical Targeting System

At a convenient location along the tube, i.e. underground, on the ground or at a serviceable height above the ground is a retargeting mirror at an angle reflecting the beam at a right angle. This mirror takes the beam shooting down the tube and directs it into a perpendicular tube: the beam shoots into a beam network. This whole unit then directs its combined beams to a network.

The network takes the beam from the concentrator and channels it with lenses and mirrors to a target area or reactor. The network joins multiple collectors of this type to form a large array of collectors feeding into the network. The Beams from all of the collectors form a super high power beam at the target location of the network.

Targeted Reactor Area/Utility Applications

The target area may employ the utility of the super high power beam at the target area to generate steam to turn turbines and generate electricity.

Objects and Advantages

This invention outlines a new apparatus, describes a new method and identifies a new means of creating a high power collimated energy beam from sunlight. The high power beam can be used to generate electricity for utilities.

Decreased Fuel Cost for Power Generation

The surprising utility of this invention is that by focusing and redirecting light a high power beam can be produced at a minimal cost—as long as there is sunlight. Rather than producing a high power beam at the cost of electricity/power to heat lights the natural resources of light it employed. No need for incoming fuel transportation costs—no ships, trains, mining or drilling to produce this fuel, is an economic advantage.

Instant Power Relocation

The mobility of the beam is also part of its surprising utility. Traveling at the speed of light the beam itself could be redirected to more distant reactors virtually instantly. Thus, the power that this invention produces could be moved at will to an optimally located steam turbine. This geographic utility offers liquid heat transport—pipes: an advantage coal trains or oil tankers can never hope to afford. So, geographic relocation of the beam is a surprise advantage this invention offers over the prior art. To provide a means to redirect light without modification of the energy form by moving the light itself to the targeted utility instead of a physical medium such as piped steam, piped hot salts or electrons over wires Highly Efficient-does not Lose Heat in Transfer Medium Efficiency in that this invention does lose energy like the prior art. In the more immediate vicinity of the invention the power beam could be directed several meters, or kilometer away from the initial target with less energy loss than the prior arts means of transportation of the thermal energy. Using a molten salt or other fluid—even hot water—demands a high loss of energy as the fluid moves through piping. By reflecting the beam with mirrors or redirecting the beam with minors, such energy loss is avoided and the production of thermal energy from a solar collected keeps more of the energy for the desired use rather than losing energy collected along the way to the target. This provides a means to redirect light without modification of the energy formed by moving the light itself to the targeted utility instead of a physical medium such as stem, hot salts or electrons over wires.

Greater Collection of Solar Power than Prior Art

This invention provides a focusing device that allows for greater collection of solar energy in one network than the prior art.

Greater Availability of Rectors or Point of Utility

This invention provides, a system that captures direct sunlight energy without conversion of the light to heat until the point of utility.

Materials are Common and Inexpensive

These materials are basic and easily made—plastic lens, simple mirrors, support aluminum trusses, motors that run at specified gear rates, pipes, etc. All materials are technologically simple compared with the complexity of manufacturing photovoltaic cells or special heat transfer salts from troughs such as the Lutz project.

Construction Doesn't Require Highly Specialized Equipment

The materials can be assembled using simple tools like drills screw drivers, nut and bolts, glue, shovels and cement and plumar's tools.

Further objects and advantages of my invention will become apparent from a consideration of the drawings and ensuing description.

DRAWING FIGURES

REFERENCE NUMERALS IN DRAWINGS

Figure 1:
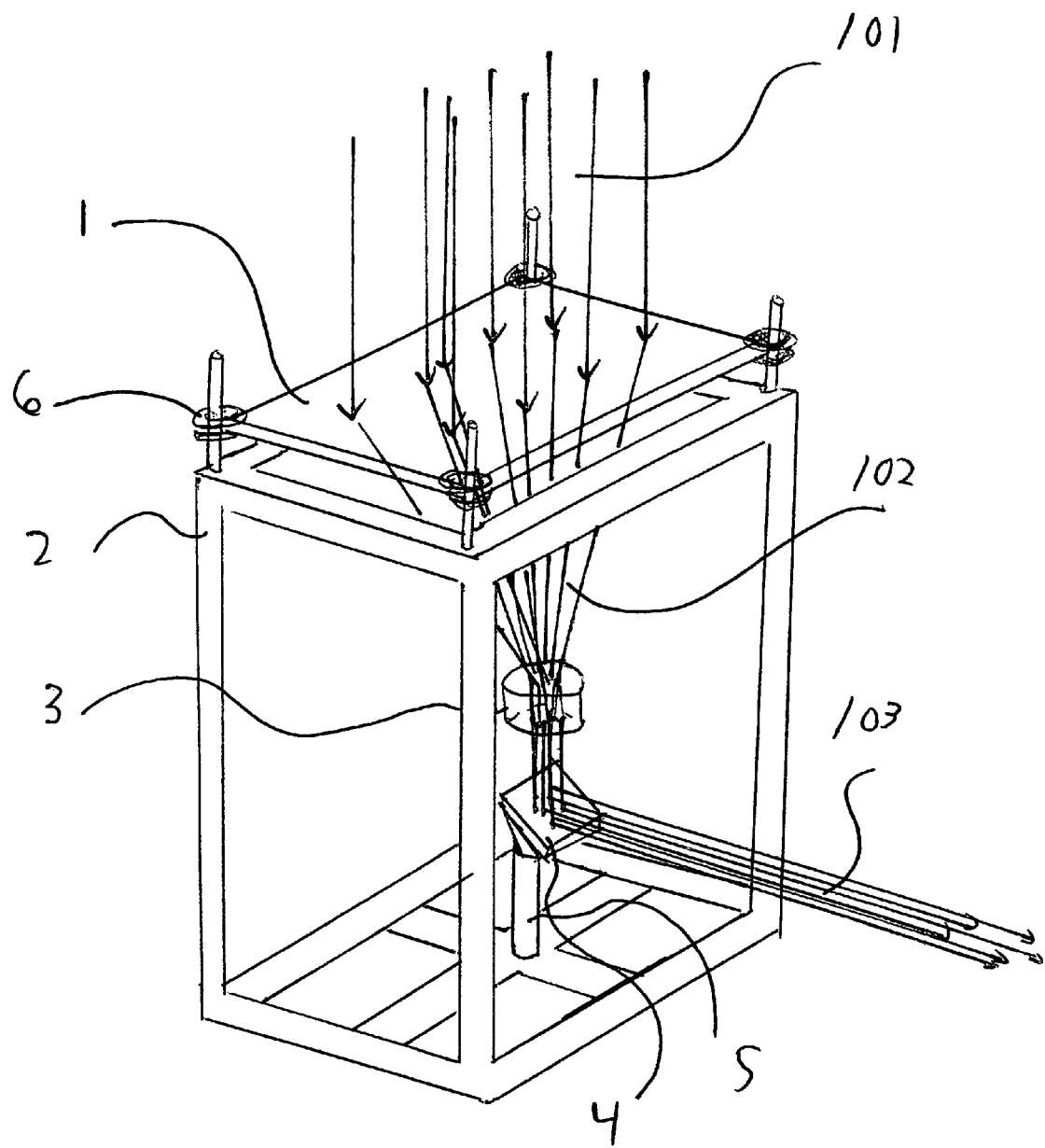
FIG. 1 is a perspective of a solar concentrating unit demonstrating incoming solar light focused on to a collimating lens and then redirected by a mirror.
Figure 2:
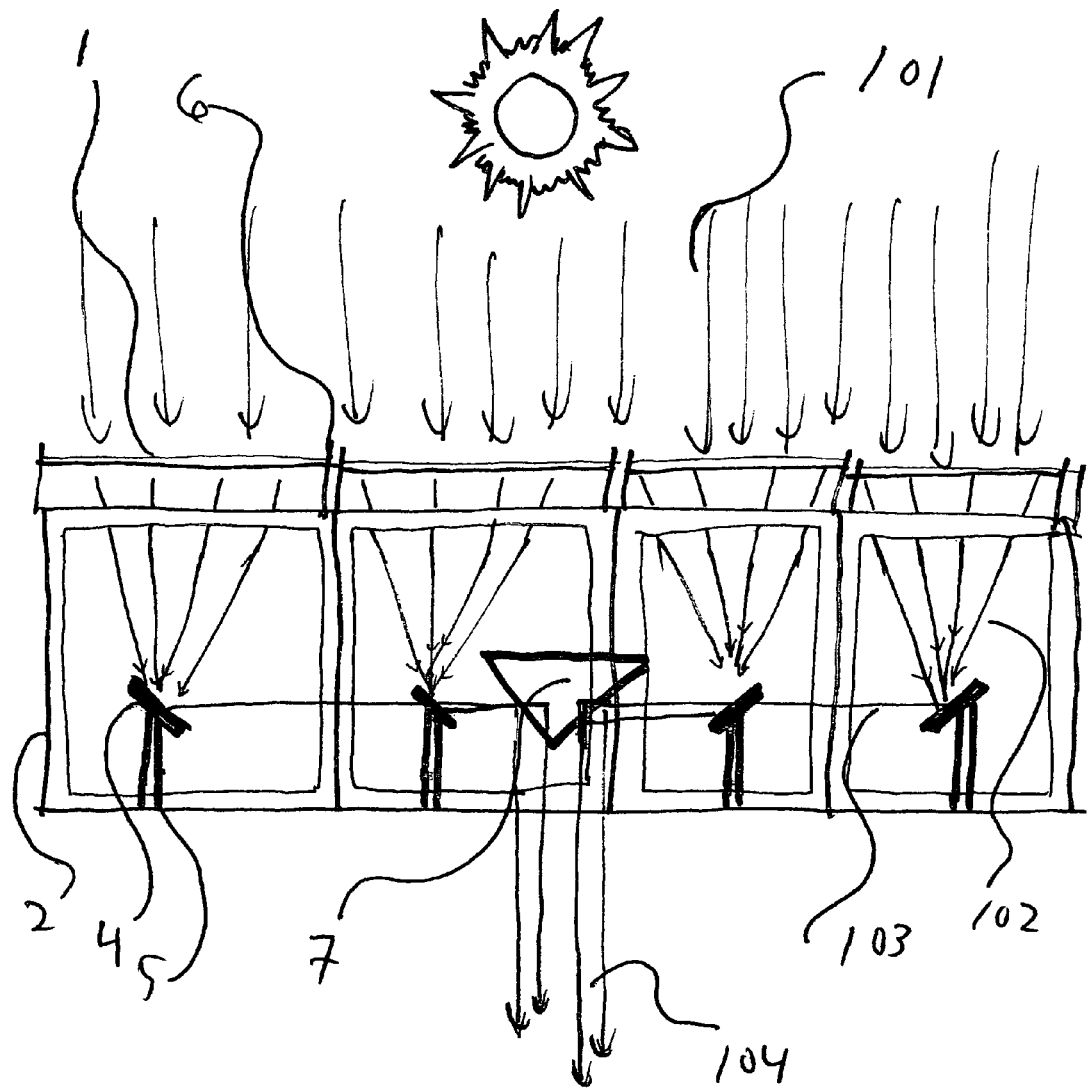
FIG. 2 is a side view of a plurality of collector units directing collimated beams of light to a central cone shaped mirror forming a solar concentrating array.
Figure 3:
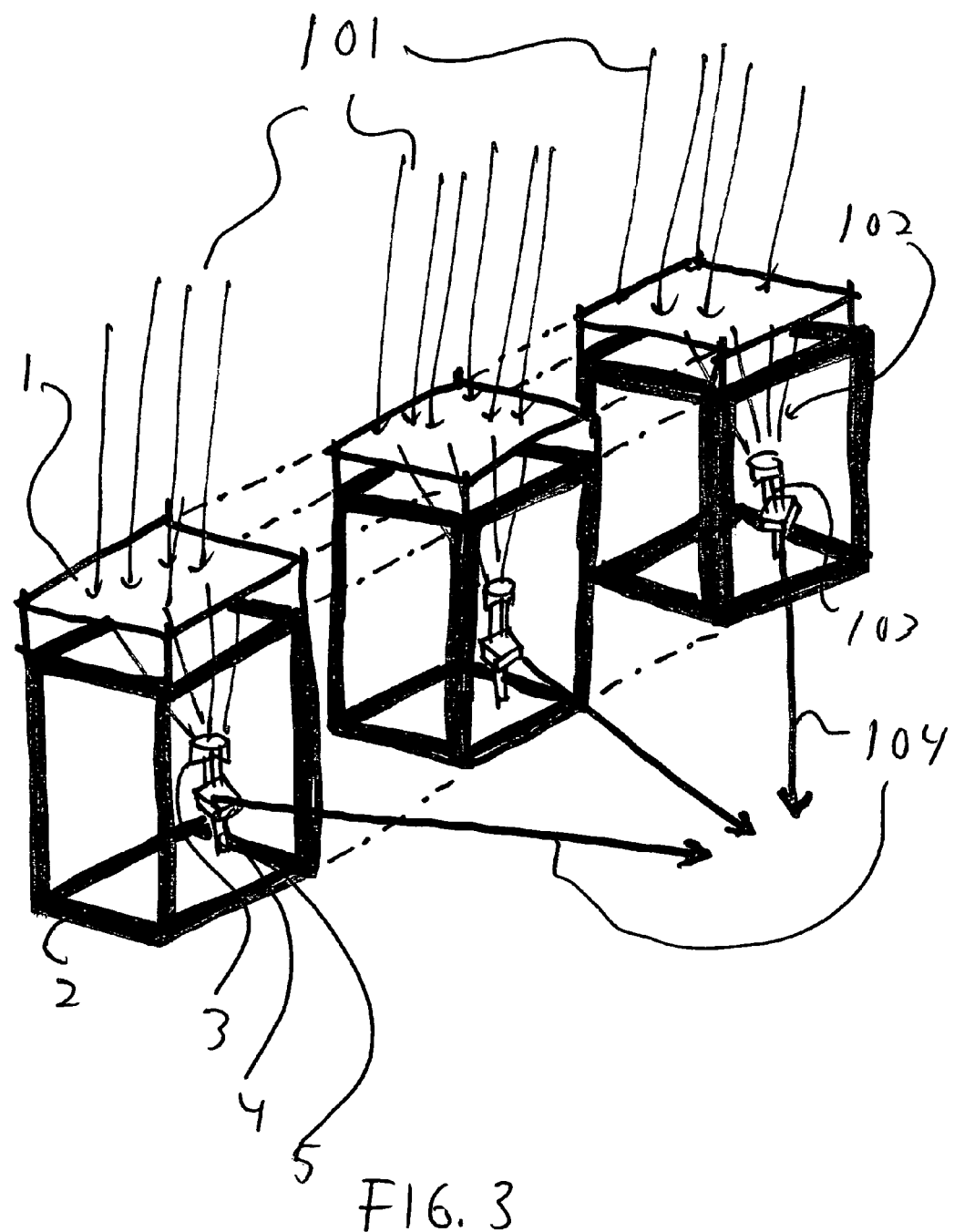
FIG. 3 is a perspective of a plurality of solar concentrating units with mirrors directing light to a central point.
Figure 4:
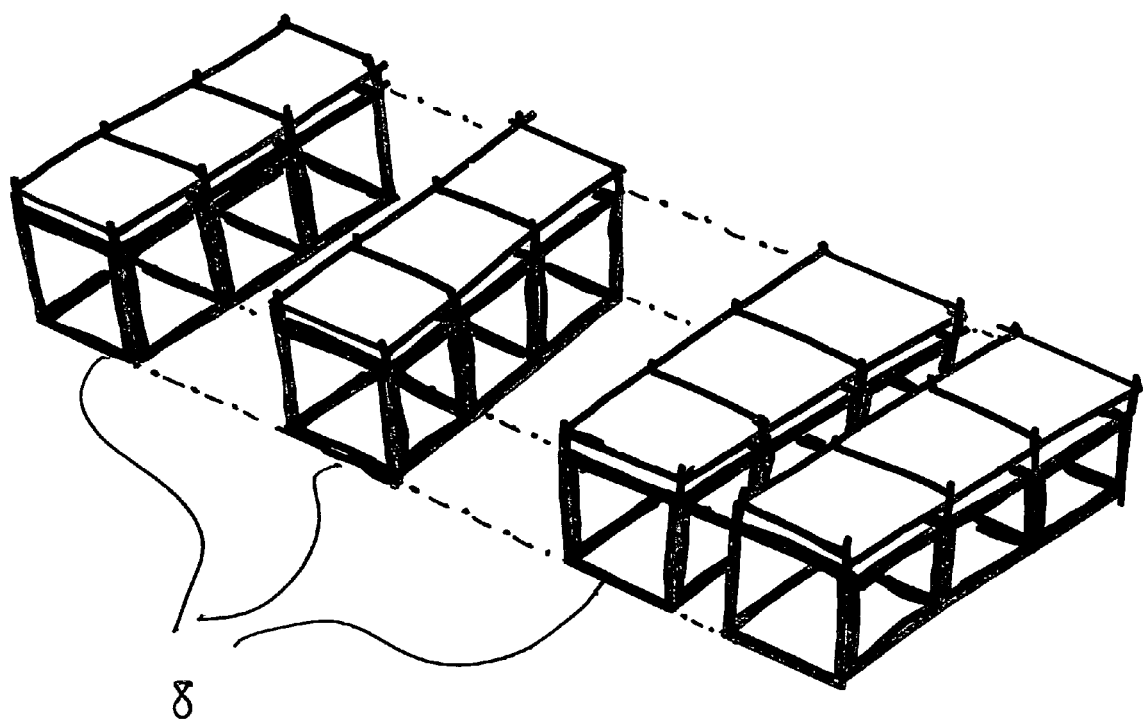
FIG. 4 is a perspective of how a plurality of adjoined units form a larger array of solar collecting units.
Figure 5:
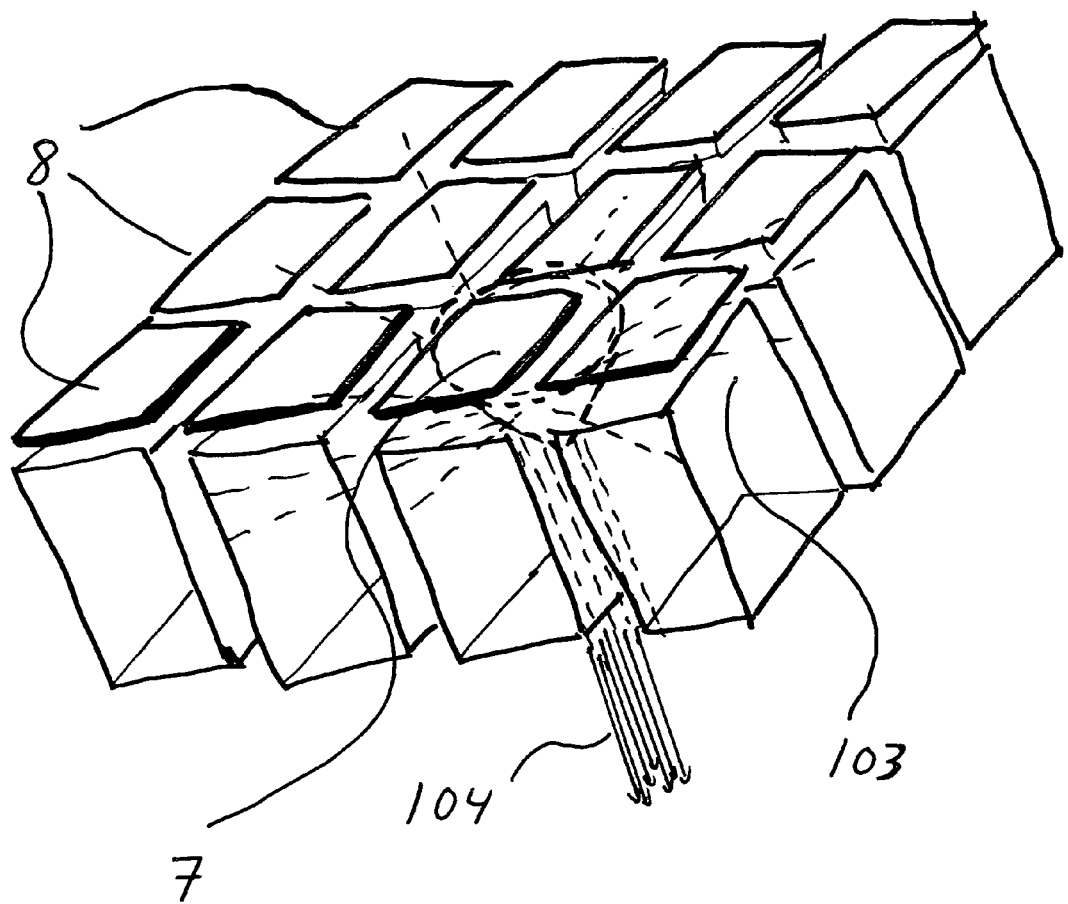
FIG. 5 is a perspective of a plurality of solar concentrating units directing collimated beams of light to a central cone shaped mirror where the cone shaped mirror creates a combined high power collimated beam from the solar concentrating array.
Figure 6:
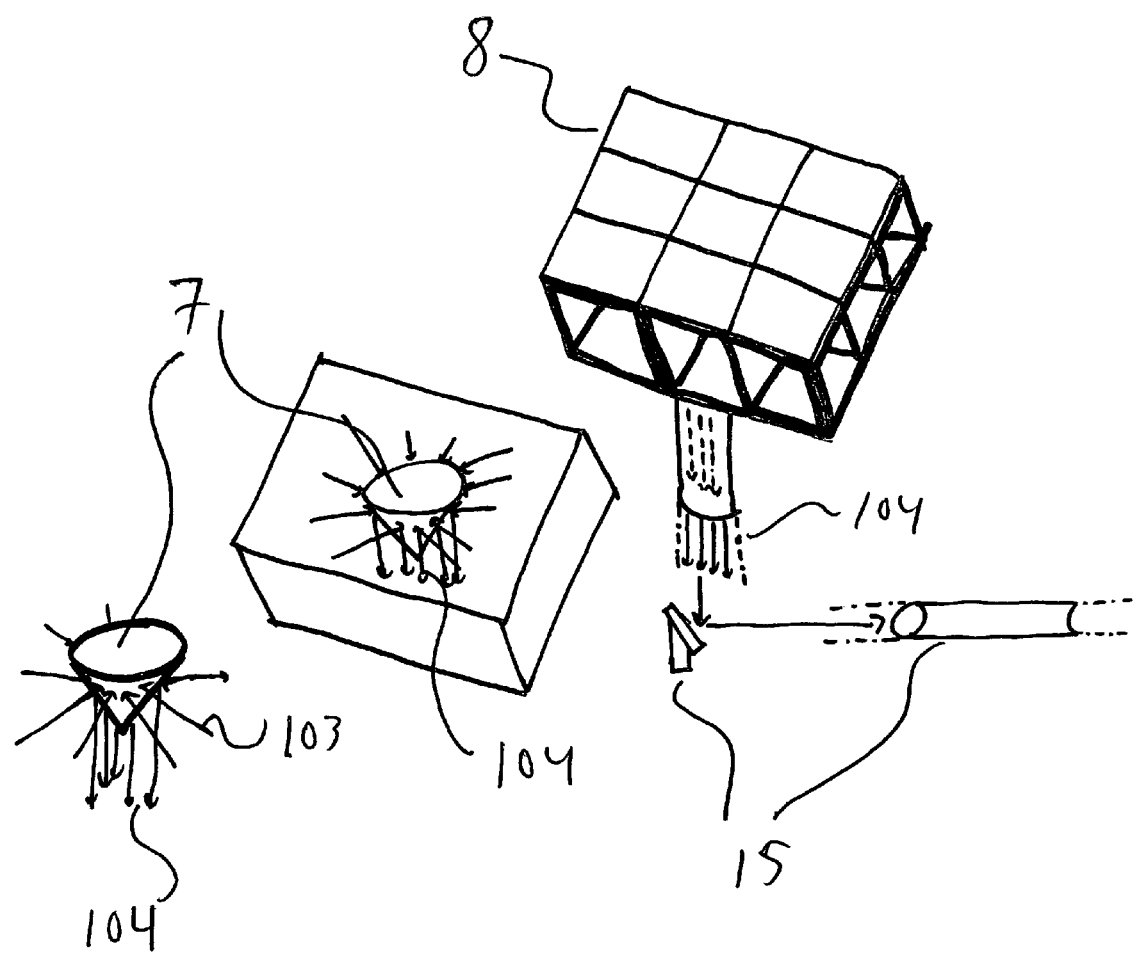
FIG. 6 is a perspective that shows how the cone-shaped mirror directs the collimated beams from the concentrating units, and the cone-shaped mirrors location relative to the solar concentrating array and how the high power collimated beams are directed away from the concentrator.
Figure 7:
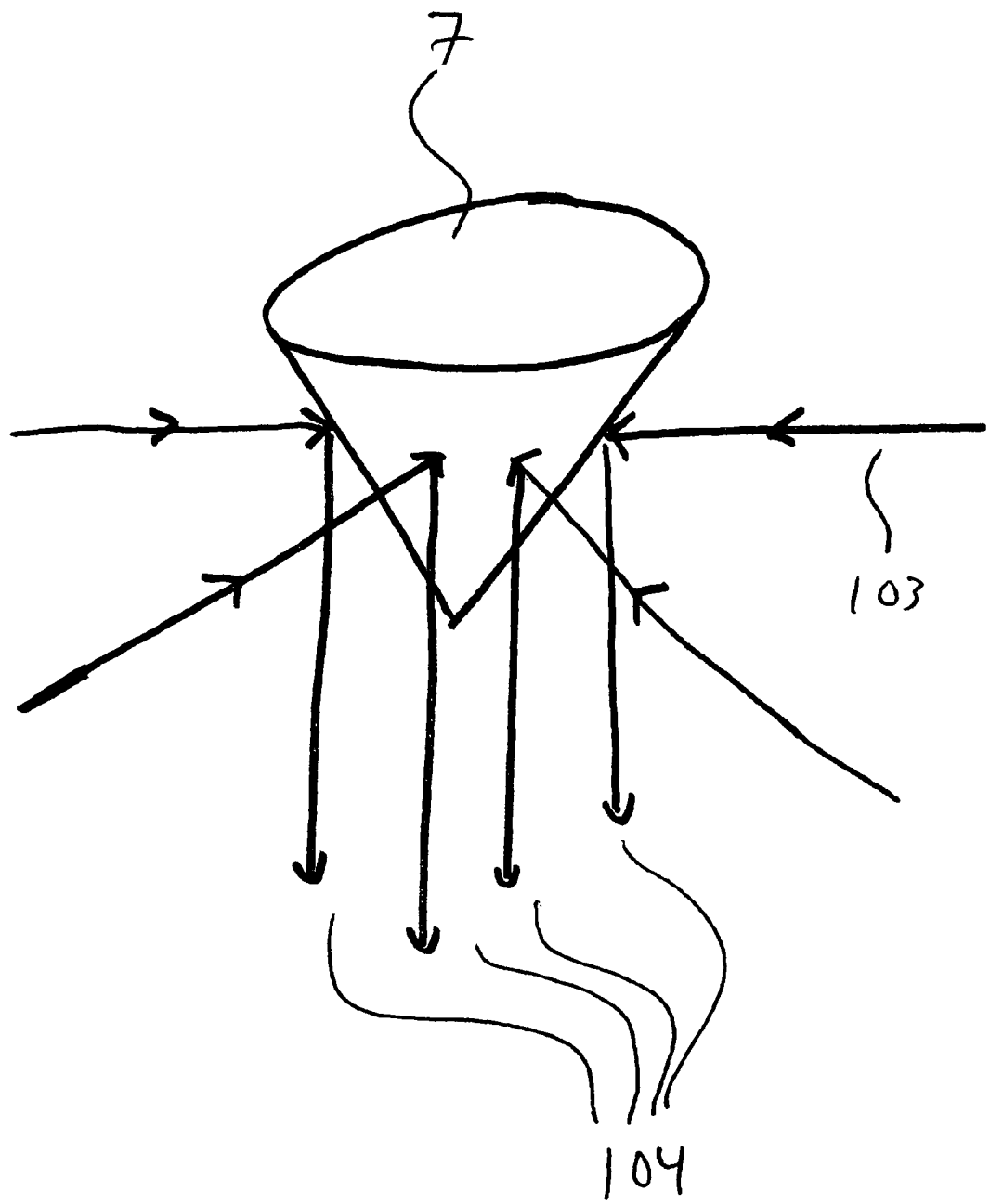
FIG. 7 is a perspective of the cone shaped mirror and how beams are directed by the mirror from collimated beams from individual solar concentrating units to form a high power concentrated collimated beam.
Figure 8:
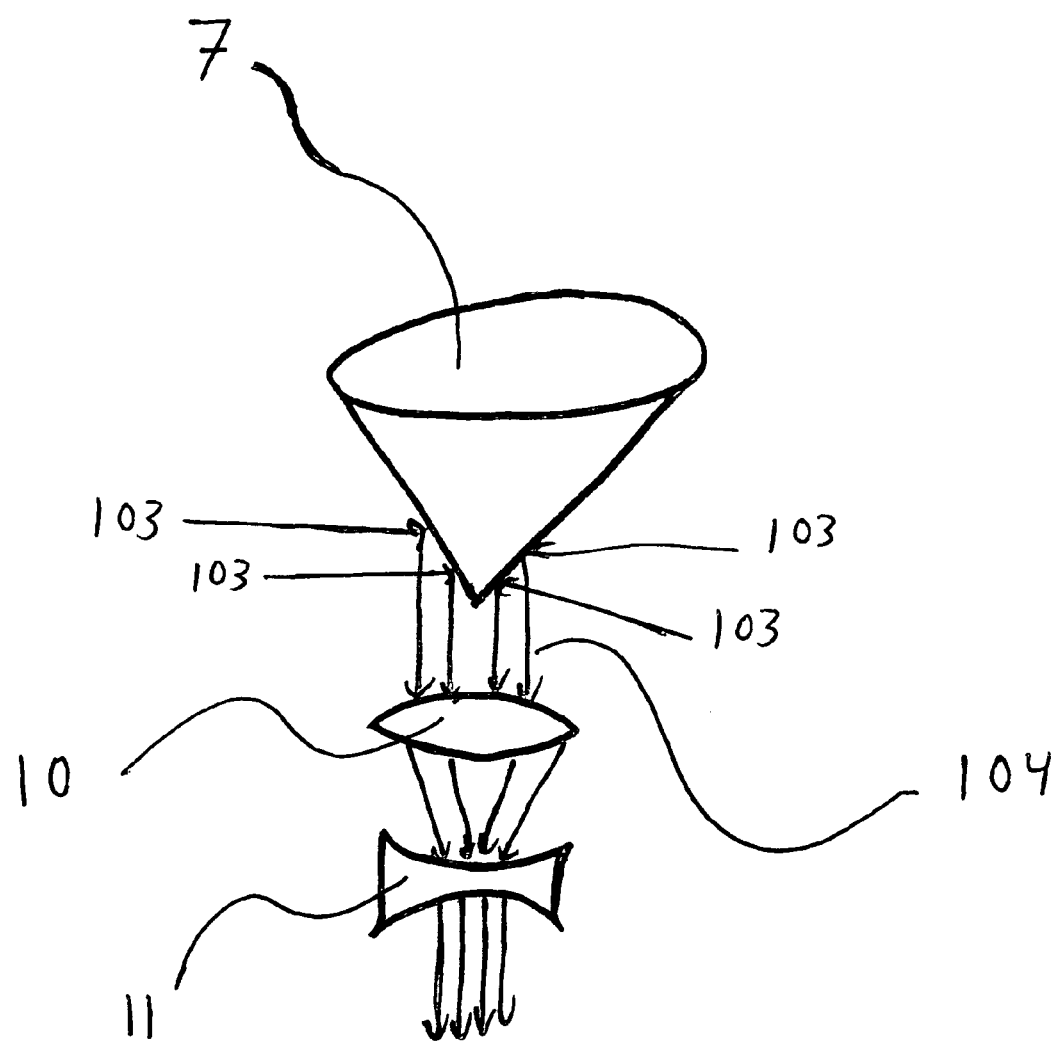
FIG. 8 is a side view of a cone shaped mirror and lenses adjusting the high power collimated beam into a more closely collimated light beam.
Figure 9:
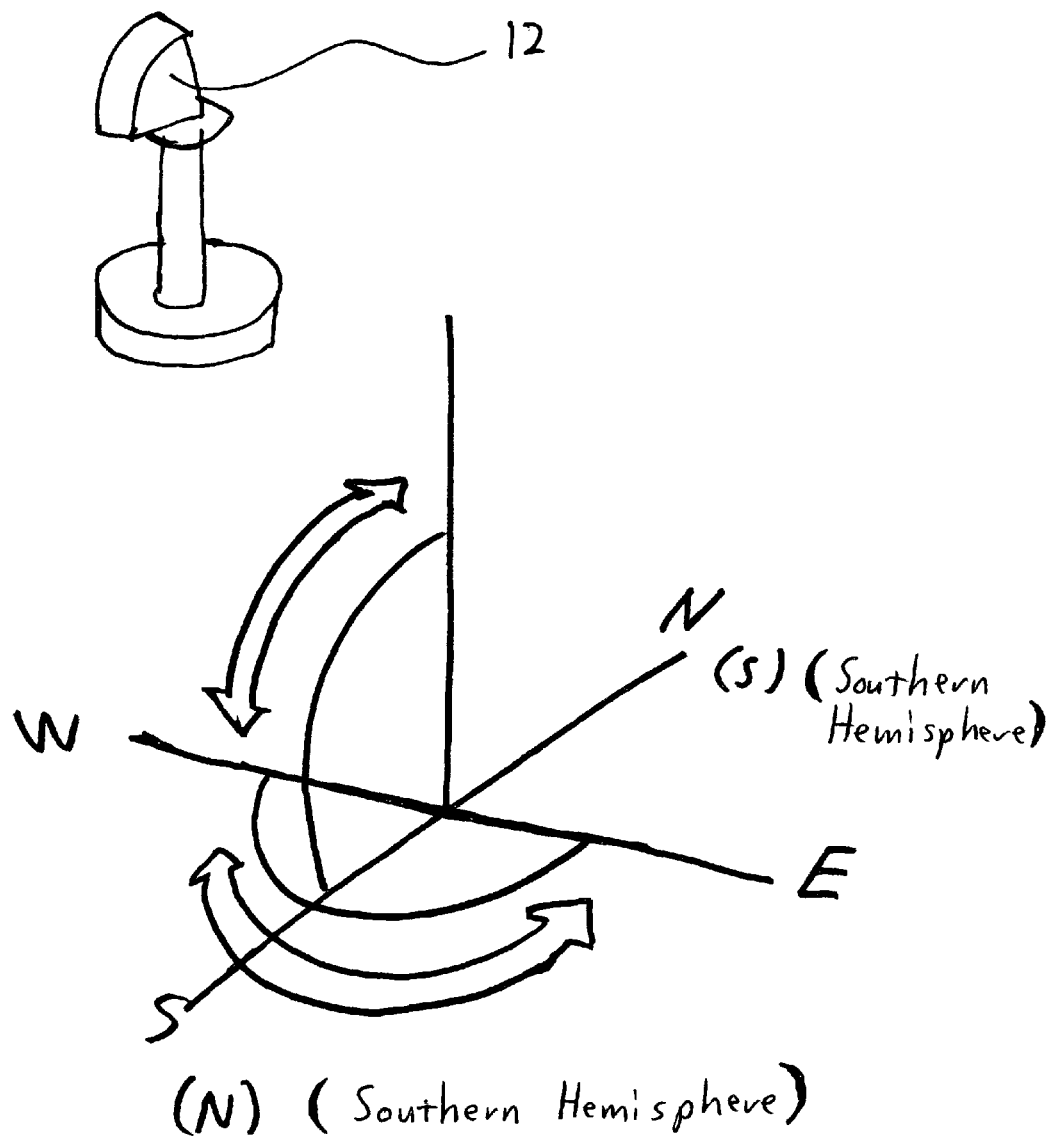
FIG. 9 is a perspective of the dual axis solar tracking system, which could function both in the northern and southern hemisphere.
Figure 10:
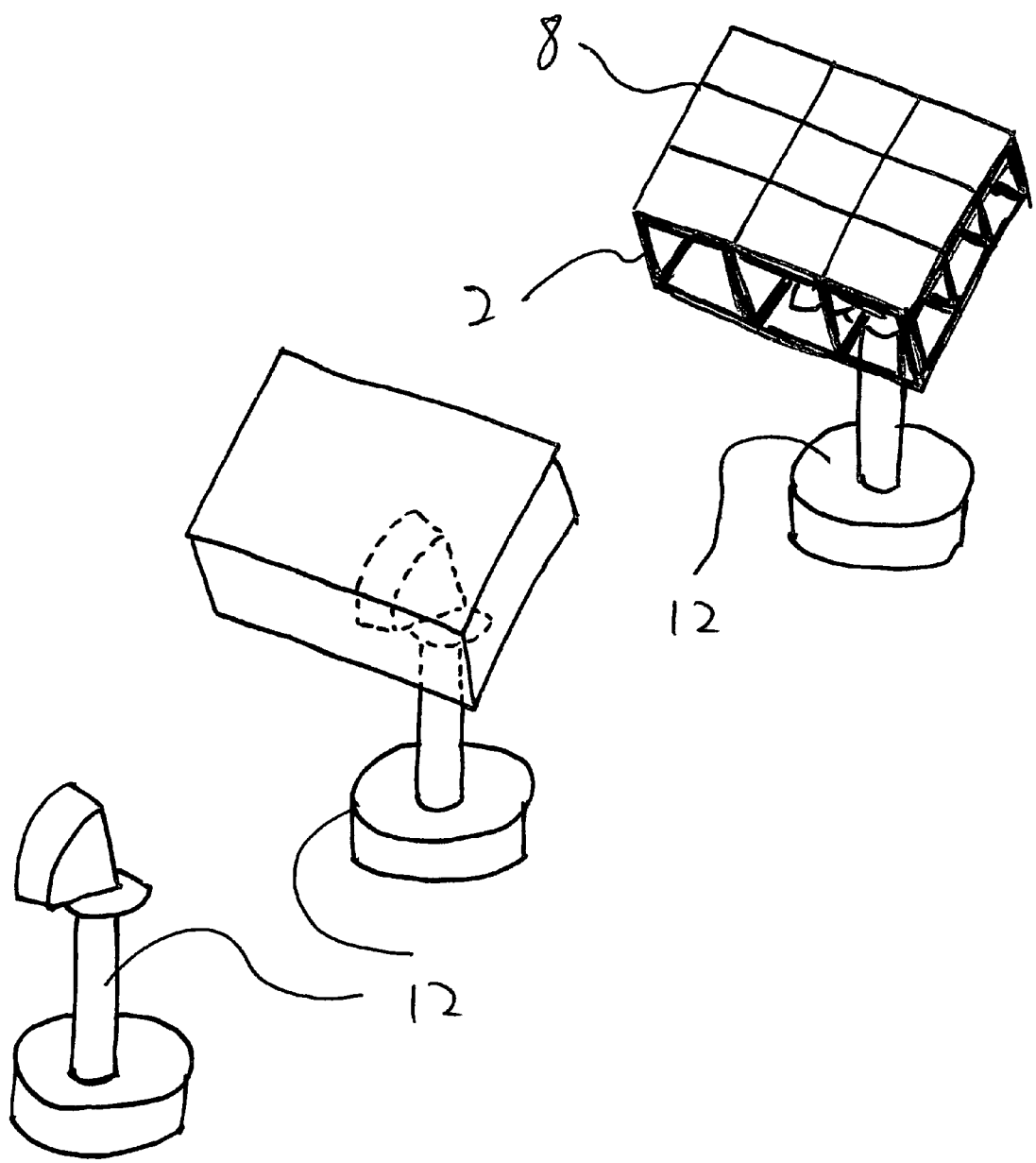
FIG. 10 is a perspective that shows the relative location of the solar tracking system/means relative to a small concentrating array.
Figure 11:
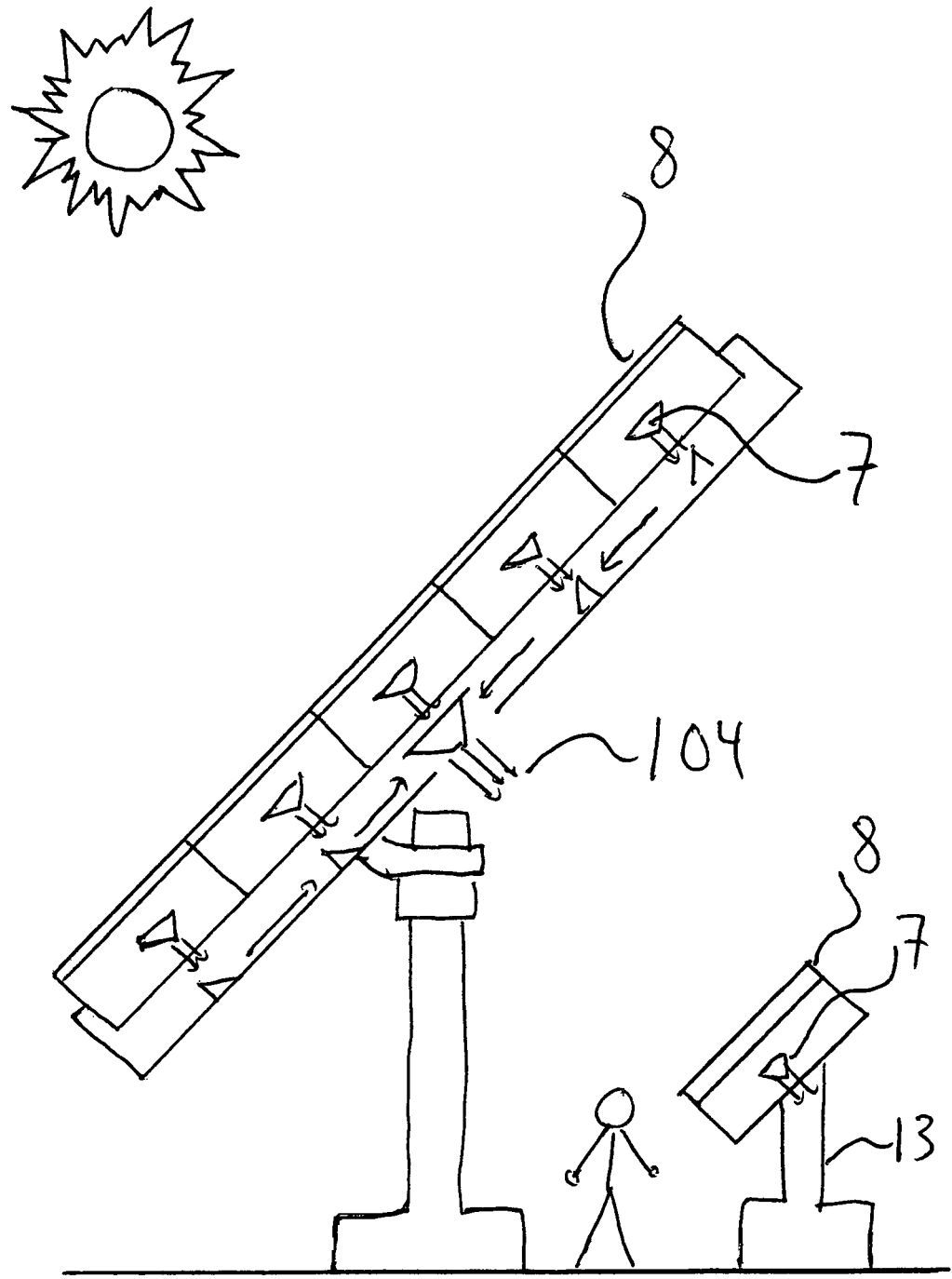
FIG. 11 is a side view of a large concentrating array with an additional third layer of mirrors and an additional cone shaped mirror, with an approximate size perspective to a small concentrating array.
Figure 12:
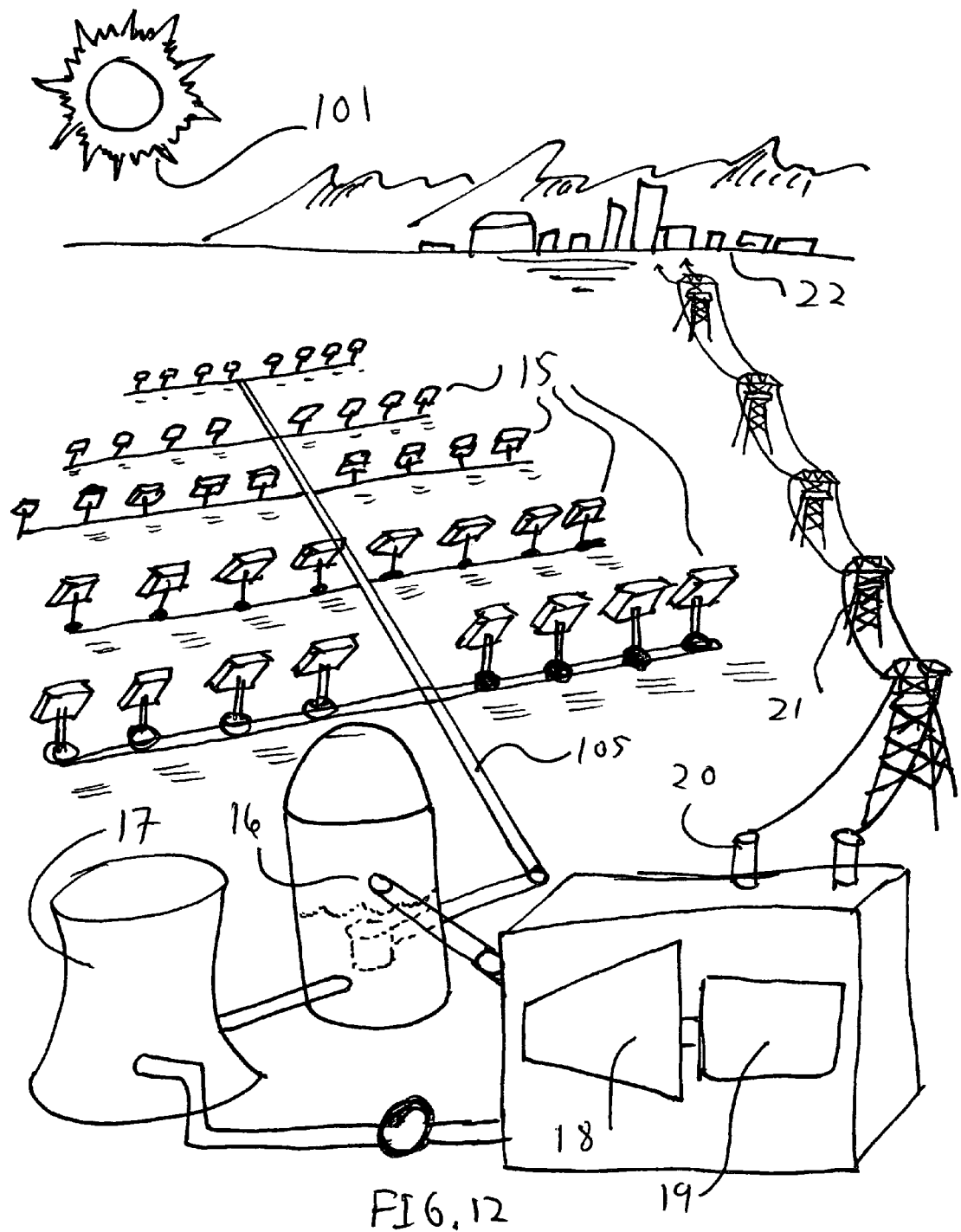
FIG. 12 is a perspective of the super high power beam network directing super high power concentrated collimated sunlight toward a target reactor to heat water and generate steam and electricity, which is then transported by power lines to a city for people to use.
Figure 13:
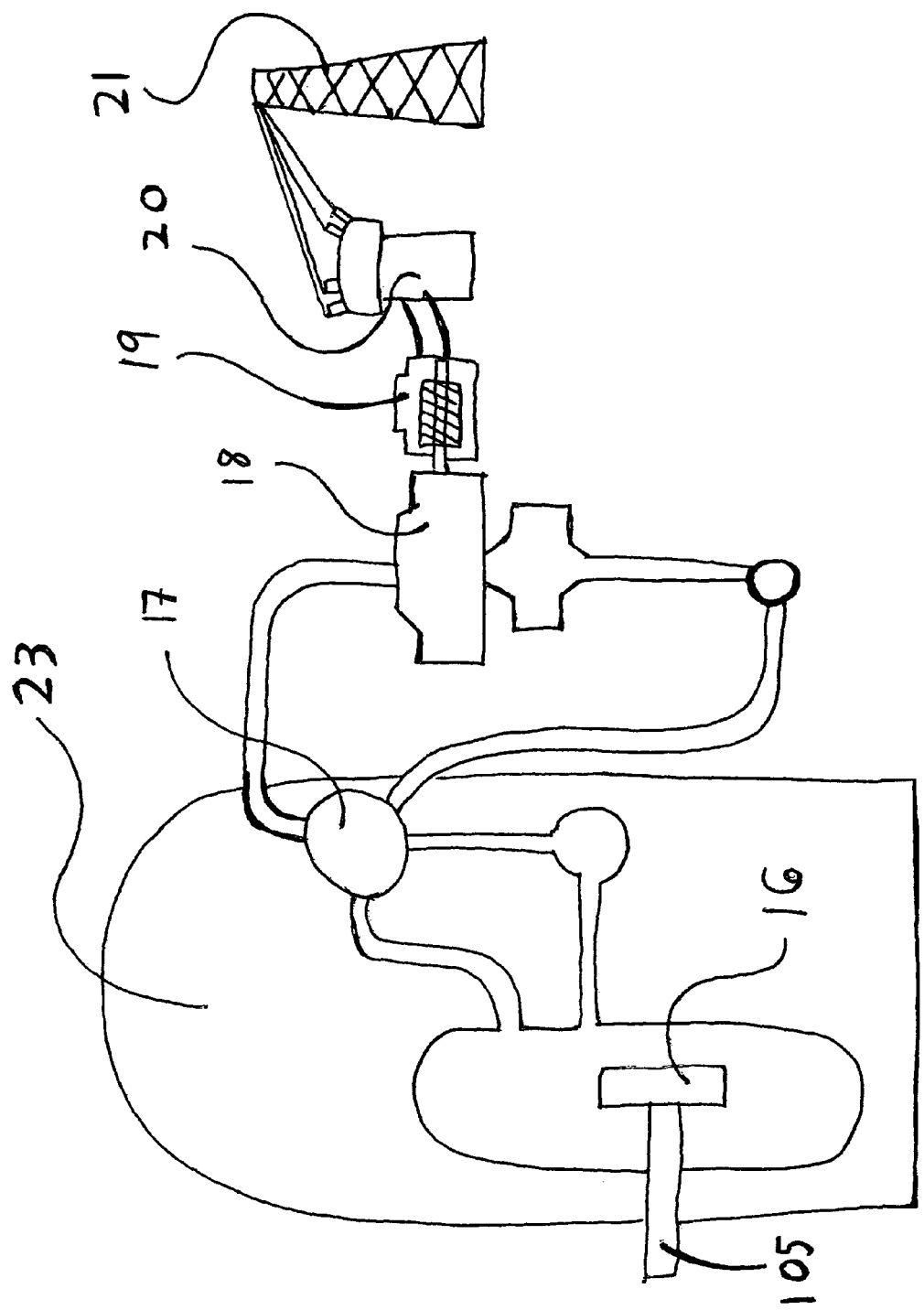
FIG. 13 is a schematic diagram of a solar reactor where concentrated high power beam solar energy is used to heat water, turn a turbine, thereby turn a generator and with a transformer create usable electric power.

1 Fresnel lens
2 Fresnel Lens support frame/plastic crate
3 Concave lens
4 Concentrating Unit Mirror
5 Concentrating Unit Mirror stand
6 support means—metal rod with washers and nuts
7 Cone shaped mirror
8 Plurality of concentrating units
9 Beam network mirror
10 Concave lens
11 Concave lens collimating
12 Solar tracker—dual axis
13 Small solar tracker
14 Large Solar Tracker
15 Beam network
16 Target chamber/Reactor
17 Water tank and Cooling tower
18 Steam Turbine
19 Generator
20 Transformer
21 Power Lines/electric power
22 City using electricity
23 Solar Reactor
101 Direct Light
102 Converging Light
103 Collimated Light
104 Reflected collimated light
105 High Power Collimated Light
106 Super High Power collimated Light
107 Networked super high power collimated light

PREFERRED EMBODIMENT

The solar radiation concentrator of the present invention is designed to concentrate direct solar radiation.

The Fresnel Lens Primary Array—Preferred Embodiment

The preferred embodiment comprises rows Fresnel lenses 1. These lenses are commonly manufactured and available as reading aide magnifiers. These Fresnel lenses 1 are a standard size of eight and a half inches by eleven inches. The can be purchased at a local office supply store. The preferred embodiment would align twelve such lenses 1 side by side to capture an area of about one square meter. The connecting sides would be along the longer or eleven-inch side of the rectangle.

The means for connecting the lenses would be preformed plastic stackable crates 2. They interlock and stack together to provide a light, durable and stable support means for each Fresnel lens. These stackable crates 2 can be purchased at office supply companies such as Staples.

The crates 2 would have to be trimmed out on the sides, except for one of the smaller sides. The inner surface of the smaller side would provide the support means for the concave lens and the redirecting minor.

The stackable crates 2 could be stacked together in a stable interlocking manner to form a strong and stable platform for the array system.

In the central area of the stackable crates a cone 7 shaped targeting mirror/lens is secured using a plastic truss. The plastic truss could be purchased at a home supply store such as Home Depot and is commonly manufactured and used to secure patio cement slabs. Portions of this plastic framing could be cut away to form the lightweight, yet durable plastic truss to support the cone shaped mirror.

The entire array can be mounted on a dual axis solar tracker 12. These are commercially available for tracking the sun.

Secondary Focal Plain Array—Preferred Embodiment

For each Fresnel lens 1 on the primary plain is a mate on the secondary plane. The mating part would be located near the focal length of the Fresnel lens. I presently prefer array-angled mirrors with concave lenses. Each of these segments best targets the secondary plane more mirrors and a cone-shaped mirror 7 with a support structure.

Immediately adjacent to each mirror 4 would be a lens 3. These lenses 3 would bend each of the 16 focal points so that each concentrated focal point would become a beam in a uniform direction. Without this the mirror 4 would reflect the light in a dispersing V-shaped pattern. With this lens 3 before each mirror, the light from each Fresnel lens 1 can be transposed into a beam—or rays of light going in a uniform direction.

The minors 4 are located at about the focal length of each of the Fresnel lenses 1 in the primary array. The primary array Fresnel lenses 1 produce rays of light which interact with the concave mirrors 3 and produce a beam that intersects at approximately the focal length of the Fresnel lens 1. This is approximately eighteen inches. The focal rays of the Fresnel lenses 1 form collimated light beam. The light beam is about ¼" in diameter. These light beams would then be re-diverted, on the next plain of mirror/lens arrays 3, 4. These 16 small circles of light would be focused on a central point in the center of the one-meter by one-meter square area.

The means of focusing the 16 beam circles is the next phase of this invention.

The principle method is to reflect each of the 16 beams using a group of mirrors 4 placed at the focal point of each lens. The mirror 4 would be at a 45-degree angle so that the beam would be directed from the location below each lens 1 toward the center of the square lens away on the plain of the focal length.

Optimally, all of the 16 beams would be pointed toward a single point near the center of the lens array square, on the level/plain of the focal point of the lenses. Some of the locations of the mirrors block the path of the beams of other mirrors to the center receiving point. These paths of travel are best redirected by targeting the initial mirror lens group toward a point that has a direct line of sight to the central receiving point. There an additional angled mirror directs the light back toward the central receiving point. This configuration allows all points to reach the central receiving point where the cone shaped mirror 7 is located.

The Central Point Cone Mirror—Preferred Embodiment

The best embodiment for this part of the invention would be a cone shaped silverized mirror 7. The cone would be at an angle of forty-five degrees. The cone minor 7 would be about two inches from point to base. The mirror may have to be specially manufactured. It 7 would also be possible to use a silverized plastic sheet cut and secured into a cone shape.

The mirror/lens 3,4 segment would focus on the cone-shaped mirror 7. The cone minor would be affixed to interact with the plane of the secondary beam plane. It would redirect all 16 beams into a one-inch beam ring. This beam ring would direct the light in the same direction as the initial wave of light. So the cone mirror 7 would direct the 16 light beams that were perpendicular to the initial direction of the sunlight to the same direction of the sunlight was traveling: parallel to the direction of the sunlight immediately before the sunlight strikes the Fresnel lens array.

The 16 beams would be consolidated into a tightly targeted area by the means of the cone mirror.

The cone mirror 7 would create a ring of the 16 beams with a diameter of about one-inch.

A ring-focusing lens 10 would be affixed below the cone mirror 7. This lens would be a means to further focus the light ring into a single unified beam. This ring-focusing lens would redirect the ring of light into a single beam of light about one-quarter inch in diameter.

At the focal point of the ring-focusing lens, there would be a lens 11 used to redirect the light into a beam so that the light energy would not be dispersed as the light passed beyond the focal point in an outward direction.

This beam-lens 10 would secure the beam ring-focusing lens 11 light. It is the means that creates a single beam of about one-quarter or one eight of an inch in diameter.

The beam-lens 10 would be the output point source for the product/utility of this invention. A single concentrated beam of light taking one meter by one meter area of direct sunlight and concentrating it to about one-thousandth by onethousandth meter of an area would create a beam 1000 times the intensity of the incoming sunlight in a given area—in this case one square meter.

Solar Tracking Means—Preferred Embodiment

The preferred embodiment of the solar tracking means would be commercially available dual axis solar tracker 12. Such a tracker 12 is commonly available at Wattsun Solar Trackers. The dual axis model AZ-225 would allow a collection of 25 concentrator arrays to be mounted on one tracker. A second mirror cone concentrator would target the array toward a targeting area that would reflect the collection of concentrating array into a collecting pipe.

The collecting pipe adjacent to the support pole the this particular concentrator would direct the concentrated beam energy into the beam network.

An alternative would be to modify a Wattsun solar tracker mount to allow the plurality of concentrator arrays to direct their mean down the support pipe. So, the support pipe would provide the support and stability necessary to stabilize this invention in normal environmental conditions. This would preferably be a galvanized steel pole approximately six to eight inches in diameter. The interior of the pipe would be used to transmit the light from the elevated location of the solar collector to the lower location of the beam network. Light would travel into the pipe through the adjustable mirror. Then the light would travel approximately in a parallel direction to the pole inside the pole. Toward the bottom of the pole, approximately three feet of the court would be a "T". The pole would have an opening in one of the sides where the light traveling parallel to the pole would be reflected at a right angle out of the pole and into the beam network.

The pole would be secured like a fence-post. A hole would be dug in the ground. The base of the pipe would be positioned in the ground and the base of the pipe would be cemented into the ground. This would secure the collector. This securing would help stabilize the collector from the forces of wind and from the changes in the weight as the collector moves to track the sun. This would also allow for a stable base so that the solar tracking means would stay on focus.

A dual axis tracker 12 would move the plane of the collector to track and keep in focus the sun throughout the daylight. The axis would include a gear system that would track the rotation along the horizon. The next gear system would track the direction of the sun along the azimuth. A simple tracking means would be to purchase a solar tracker drive system that his is part of a modern day telescope such a Celestron telescope. The tracker 12 is computerized to track the sun or once geographic coordinates are input into the computer. Other solar tracking systems are also available for commercial tracking systems 14.

Dual Axis Targeting Mirror—Preferred Embodiment

Also located in the immediate area of the dual axis drivers for solar tracking 12 is a dual axis mirror. This mirror takes the light beam from the concentrator: it is then reflected from this dual axis movable mirror. The alignment of the mirror changes constantly to coordinate the mirror's dual axis position relative to the ground based location. (It would be possible to dispense with this mirror if the collector was located in space and not in an orbit.) The mirror functions to target the beam down the mounting tube. The targeting mirror then shoots the beam down the support tube toward the ground and away from the concentrator.

The Beam Network—Preferred Embodiment

The beam network 15 is a series of mirrors that reflect light to a central point. For safety and to avoid optical disruptions such as dust clouds, fog or animals/insects the path of the reflected beams would be surrounded by pipes. The pipes would be two to eight inches in diameter. Whatever is most convenient for cleaning, repair and general operation. Also whatever would be most economical in terms of cost assembly and maintenance as well as support structure to keep them elevated above the ground.

Theses groups of pipes at about twelve inches off the ground is a re-targeting mirror. This mirror would be secured to the interior of the support pole. The mirror would be fixed at an angle (a forty-five degree angle) reflecting the beam at a right angle. This mirror takes the beam shooting down the pole and directs it into a perpendicular tube. The tube would surround the pathway of the beam. The tube would be perpendicular to the ground. The beam shoots down the tube into a beam network 15. This whole unit then directs its combined beams from a network 15 toward a central point. The network 15 takes the beam from the concentrator and channels it with lenses and mirrors to a target area or reactor. The network 15 joins multiple collectors of this type to form a large array of collectors feeding into the network 15.

At the target location 16 of the network 15 all of the light beams come together to form a super high power beam, to heat water 18 to generate steam 18 and electricity 21.

ALTERNATIVE EMBODIMENTS

Second Concave Lens to Further Focus and Refine the Beam

Multiple arrays could be mounted next to each other to form a plurality of concentrators. The plurality of higher power collimated light beams could then be collected in a third plane of a reflecting minor and a second cone shaped mirror. This could collect, for example, the light from 25 concentrators into a single beam. This larger array of concentrators could be mounted on a larger solar tracker for more industrial purposes.

Lens Substitutes

The use of lenses could be substituted for minors in the primary plain and in the secondary plain.

Support Structures—Alternate Materials

Many of the structural support 6 materials could be exchanged between wood, plastic or metal beams.

Lenses—Alternative Materials

Glass Fresnel lenses 1 could be used instead of plastic Fresnel lenses, glass or plastic lenses could also be substituted.

Fresnel Lens Support Means—Alternative Materials

The aluminum framing 6 is available at a local hardware store. Aluminum framing that is readily available and relatively inexpensive is an aluminum frame that is manufactured for use with screen door framing. These frames are used to secure screens in windows or in screen doors. This framing comprises a hollow rectangular rod which has a groove in the road to secure a rubber tape. Rather than using the groove in the rod for rubber tape the plastic lenses can be aligned along the groove. This provides a securing means 6 along one of the axis's of the Fresnel lenses.

Solar Trackers—Multiple Configurations

Each array could have a smaller solar tracker 13. This would be best suited for smaller applications.

Multiple arrays could also be mounted on larger solar trackers 14. For example an approximately 5 by 5 system of trackers could be mounted on a larger solar tracker. This would increase the efficiency of the cost and operation of the trackers.

Beam Network—No Pipes, Mirrors Only

The network could be created without pipes, but rather consist sole of the mirrors or lenses that target the light to the point of utility. This could save the cost of piping, but would make the tracking of high power light beams more difficult for operators or maintenance workers.

Operation

This invention operates by first targeting the collector at the sun. Then the invention is operated by activating the solar tracking means 12. Once the drivers for the solar tracking means are operating the invention collects and concentrates solar radiation. Further operation would include maintenance such as cleaning and parts replacement.

Operation would include monitoring the equipment for any breakdown would also be important for safety as the high power beams produced by the invention could damage equipment if there is a breakdown. This could be addressed by having emergency shade-blinds to cover the primary lens array thereby stopping any concentration. A sensor could automatically trigger the blinds if the sunlight is not focused on the sensor. It could also be ameliorated by setting up sensors that would track the sun.

Maintenance would include cleaning of the optics from dust particles or heat damage as the wear and tear on equipment may require replacement on a routine schedule.

The Functional Operation of this Invention

This invention collects direct sunlight and produces concentrated collimated light beams. Targeting the sun by tracking it with dual axis tracker 12 maintains the appropriate focus of direct sunlight in the concentrating system. This invention is operated by tracking the sun to keep the focus of the sun on target. Once the sun is targeted and the focus is maintained through the tracking means, this invention operates continuously to generate concentrated light beams. The availability of sunlight is the only limit of operation of this invention. Should this invention be located in space it could function continuously, unobstructed by terrestrial weather or the sunset. In a non-terrestrial location such as in a geocentric orbit around a planet, or stationed on the moon, this invention could operate continuously. This invention focuses sunlight on one level where it is redirected and refocused from a converging/diverging focal point into a beam and the by redirecting the light beam again and again several more times into a target chamber 16. The initial Fresnel lens 1, concave lenses 3, and mirrors 4 track the sun by a computer tracking means which would guide each collector or an array of collectors on dual axis to exactly focus the sunlight in the lenses. This solar tacking means is commonly available from commercial suppliers for photovoltaic sells. This would be tracked throughout the sunlight's presence-dawn to dusk.

Each collector focuses the light into a concentrated beam. The beam is directed into a tracking lens and the to a network of mirrors 15 and lenses that direct the light to a target 16.

The target contemplated in this invention includes but is not limited to: targeting light onto a target reactor 16 to heat water 17, driving a steam turbine 18, thereby driving a generator 19, a transformer 20, and generating electric power 21.

CONCLUSION, RAMIFICATIONS, AND SCOPE

Accordingly, this invention provides a practical source of concentrated solar energy for more economic power generation, increased effianctcy in transportation of solar energy, simple and common construction materials, and ease of construction.

Although the description above contains many specificities, these should not be construed as limiting the scope of the invention but as merely providing illustrations of some of the presently preferred embodiments of this invention. For example, the mirrors could be substituted with lenses of the appropriate shape needed to redirect light at a variety of angles; the primary and secondary plains could be mounted on large solar trackers in collections of approximately 5 meters by 5 meters; the beam network could be located underground or under a decking surface, etc.

Thus the scope of the invention should be determined by the appended claims and their legal equivalents, rather than by the examples given.

I claim:

1. A solar energy system comprising:
   a) an array of fresnel lenses interlocked together in a primary plane affixed to a dual-axis mirror solar tracking means to rotate the array to keep the fresnel lenses perpendicular to parallel direct sunlight and thereby keeping the focus of the fresnel lens direct on target toward collimating lenses;
   b) said collimating lenses positioned beneath each fresnel lens, near the focal point of each fresnel lens;
   c) a mirror positioned beneath each collimating lens at about forty-five degrees to direct a collimated beam toward a cone shaped mirror at the central point of the array;
   d) a plurality of additional angled mirrors for each array that does not have a direct light path from its first mirror beneath the collimating lens to a second reflector for directing collimated light toward said cone shaped mirror at the central point of the array;
   e) said cone shaped mirror located at the central point of the array, positioned such that the point of the cone is away from fresnel lenses;
   f) said cone shaped mirror would point toward a dual-axis mirror positioned to reflect the beams from the cone shaped mirror affixed to the fresnel lens array down the support metal tube affixed to the ground or surface, where the dual-axis mirror within a support metal tube, directs the collimated beams to a right angle retargeting mirror;
   g) a right angle retargeting mirror directing the collimated beams from the metal support tube toward a beam network; and
   h) a plurality of mirrors which form a beam network by reflecting the high power collimated light energy to a location several meters or a kilometer away.

2. The system of claim 1 with the additional element,
   i) an array of multiple collimating solar power collectors described in claim 1 which direct their light together toward a common point of utility.

3. The system of claim 1 with the additional element,
   i) an array of multiple collimating solar power collectors described in claim 1 which direct their light together toward a plurality of mirrors which combine the collimated beams into a high power beam.

4. The system of claim 1 with the additional element,
   i) an array of multiple collimating solar power collectors described in claim 1 which direct their light together toward a steam turbine reactor.

5. The system of claim 1 wherein element f) is,
   f) the cone shaped mirror would point toward a ring focus lens to further unify the collimated beams and a subsequent beam-lens to unify the plurality of beams into a single collimated beam which would then direct the single concentrated beam of light toward a dual-axis mirror positioned to reflect the beams from the cone shaped mirror affixed to the fresnel lens array down the support metal tube affixed to the ground or surface, where the dual-axis mirror within the support metal tube, directs the collimated beams to a right angle retargeting mirror.

6. The system of claim 1 wherein element f) is,
   f) the cone shaped mirror would point toward a mirror positioned beneath each cone shaped mirror at about forty-five degrees to direct the collimated beam toward a large array cone shaped mirror at the central point of the large concentrating array, toward a large concentrating array dual-axis mirror positioned to reflect the beams from the large cone shaped mirror affixed to the fresnel lens array down the support metal tube affixed to the ground or surface, where the dual-axis mirror within the support metal tube, directs the collimated beams to a right angle retargeting mirror.

7. The system of claim 1 with the additional element,
   i) an array of multiple collimating solar power collectors described in claim 1 which form a large array of collectors feeding into a series of mirrors that reflect light to a central point which form the beam network.

8. Apparatus of claim 7 whereby said beam network mirrors are positioned for global instant power relocation to direct the high power beam virtually instantly to more distant reactors globally traveling at the speed of light 299,792.4 kilometers per second, whereby the earth's circumference is about 41,000 kilometers.

9. The system of claim 1 wherein the output collimated beam is greater than one thousand (1000) more concentrated than the incoming direct solar radiation that strikes the fresnel lenses.

10. A solar energy apparatus comprising:
    a) an array of fresnel lenses interlocked together in a primary plane;
    b) collimating lenses positioned in a plane beneath each fresnel lens, near the focal point of each fresnel lens and a mirror positioned beneath each collimating lens positioned to direct the collimated beam about forty-five degrees, toward the central pointy of the array;
    c) a cone shaped mirror located at the central point of the array, positioned such that the point of the cone is away from fresnel lenses;
    d) a dual-axis mirror solar tracking means to rotate the array to keep the fresnel lenses perpendicular to the sun and the beams on target for the array;
    e) a dual-axis mirror positioned to reflect the beams from the cone shaped mirror down a support metal tube;
    f) a right angle retargeting mirror directing the collimated beam into a beam network;
    g) a beam network comprising a plurality of mirrors to direct the high power collimated light energy to a location several meters or a kilometer away.

11. Apparatus of claim 10, whereby said beam network mirrors are positioned over kilometers to effect power relocation to distant geographic location of the light energy.

12. Apparatus of claim 11 whereby beam network mirrors direct the collimated light to a distant geographically located target reactor.

13. Apparatus of claim 10 comprising, the additional element of a distant target rector several meters or a kilometer away.

14. Apparatus of claim 13 whereby said target reactor is a steam turbine electric generator.

15. Apparatus of claim 10 whereby said beam network mirrors are positioned for global instant power relocation to direct the high power beam virtually instantly to more distant reactors globally traveling at the speed of light 299,792.4 kilometers per second, whereby the earth's circumference is about 41,000 kilometers.

16. A means for concentrating solar energy comprising;
a) focusing parallel, direct solar radiation using a plurality of fresnel lenses;
b) collimating the light near the focal point of each fresnel lens;
c) reflecting the collimated light from each fresnel lens using a mirror to a central point in the array;
d) collecting and combining all of the collimated beams from each fresnel lens using a cone shaped lens positioned near the central point of the array, and directing the collected collimated beams down a support pipe;
e) maintaining focus of arrays using a solar tracking means and a dual axis targeting mirror to keep the collected collimated beam on target down the pipe;
f) combining the light energy from one array to a greater network of multiple arrays, by using a right angle mirror to retarget the beams from an array into a network;
g) joining multiple collectors of this type to form a large array of collectors feeding into the network by reflecting collimated light into a large network.

17. A method for converting solar energy;
a) whereby a fresnel lens collimating unit is continually positioned where the direction of the sun in a z-axis is maintained perpendicular to the x and y axis of the fresnel lens in a three dimensional manor, whereby the x and y axis of the fresnel lens change to maintain the x and y axis of the fresnel lens perpendicular the location of the sun, the z-axis, sunlight is refracted through the fresnel lens and focused in a converging beam;
b) the converging beam of sunlight is then refracted using a collimating lens, into a collimated beam;
c) a mirror positioned beneath each collimating lens at about forty-five degrees to direct the collimated beam toward a cone shaped mirror at the central point of the array;
d) a cone shaped mirror located at the central point of the array, positioned such that the point of the cone is away from fresnel lenses;
e) a dual-axis mirror solar tracking means to rotate the array to keep the fresnel lenses perpendicular to the sun and the beams on target for the array;
f) a dual-axis mirror positioned to reflect the beams from the cone shaped mirror down a support metal tube;
g) a right angle retargeting mirror directing the collimated beam into a beam network; and
h) a beam network of comprising a plurality of mirrors to direct the high power collimated light energy to a location several meters or a kilometer away.

18. A solar energy system, comprising:
a) A plurality of fresnel lenses continually re-positioned where the line between the center point of the sun and the fresnel lens is the z-axis, where the z-axis is maintained perpendicular to the x and y axis of the array of fresnel lenses in a three dimensional manor, whereby the x and y axis of the fresnel lenses change to maintain the x and y axis of the fresnel lenses in a perpendicular position relative to the z-axis, the z-axis being the line between the center point of the sun and the x-axis and y-axis of the fresnel lens plane;
b) A plurality of collimating lenses located near the focal point of each fresnel lens whereby each collimating lens refracts the converging sunlight from the fresnel lens into a collimated beam, or bundle collimated beams of sunlight from each fresnel lens which are reflected by a mirror to a cone shaped mirror;
c) a cone shaped mirror located at the central point of the array, positioned such that the point of the cone is away from fresnel lenses;
d) a dual-axis mirror solar tracking means to rotate the array to keep the fresnel lenses perpendicular to the sun and the beams on target for the array;
e) a dual-axis mirror positioned to reflect the beams from the cone shaped mirror down a support metal tube;
f) a right angle retargeting mirror directing the collimated beam into a beam network; and
g) a beam network comprising a plurality of mirrors to direct a high power collimated light energy to a location several meters or a kilometer away.

19. A method of instant collimated solar power relocation whereby the system of claim 18, positions mirrors for global instant power relocation to direct a high power beam virtually instantly to globally located points of utility, traveling at the speed of light 299,792.4 kilometers per second, whereby the earth's circumference is about 41,000 kilometers.

20. A collimating solar power collector comprising:
a) an array of fresnel lenses interlocked together in a primary plane;
b) collimating lenses positioned in a plane beneath each fresnel lens, near the focal point of each fresnel lens and a mirror positioned beneath each collimating lens positioned to direct the collimated beam about forty-five degrees, toward the central pointy of the array;
c) a cone shaped mirror located at the central point of the array, positioned such that the point of the cone is away from fresnel lenses;
d) a dual-axis mirror solar tracking means to rotate the array to keep the fresnel lenses perpendicular to the sun and the beams on target for the array;
e) a dual-axis mirror positioned to reflect the beams from the cone shaped mirror down a support metal tube;
a right angle retargeting mirror directing the collimated beam into a beam network.

* * * * *